United States Patent

Geissinger et al.

[11] Patent Number: 5,961,888
[45] Date of Patent: Oct. 5, 1999

[54] CERAMIC ELECTRIC RESISTOR

[75] Inventors: Albrecht Geissinger, Muehlacker; Juergen Oberle, Sindelfingen; Werner Teschner, Stuttgart; Horst Boeder, Sindelfingen; Karl-Heinz Heussner, Leonberg, all of Germany

[73] Assignee: Robert Bosch GmbH, Stuttgart, Germany

[21] Appl. No.: 09/131,866

[22] Filed: Aug. 10, 1998

Related U.S. Application Data

[63] Continuation-in-part of application No. 08/817,596, filed as application No. PCT/DE95/01452, Oct. 19, 1995, abandoned.

[30] Foreign Application Priority Data

Oct. 19, 1994 [DE] Germany ............................ 44 37 324
Oct. 18, 1995 [DE] Germany ............................ 195 38 695

[51] Int. Cl.$^6$ ................................ H01B 1/16; H01B 1/18
[52] U.S. Cl. ...................... 252/511; 252/516; 252/521.5; 252/520.2; 428/446; 428/447
[58] Field of Search ................................ 252/510, 511, 252/516, 521.5, 520.2; 428/36.9, 36.92, 447, 446; 524/780, 785–787; 338/7, 225 D

[56] References Cited

U.S. PATENT DOCUMENTS

| | | |
|---|---|---|
| 3,027,332 | 3/1962 | Medin ................................... 252/520 |
| 4,104,509 | 8/1978 | Van Bokestal et al. ................ 219/544 |
| 4,545,914 | 10/1985 | Graiver et al. .......................... 252/511 |
| 4,634,756 | 1/1987 | Satchidanand et al. ................ 219/544 |
| 4,666,628 | 5/1987 | Ucikawa ................................. 252/500 |
| 5,015,413 | 5/1991 | Nagaoka ................................. 252/518 |
| 5,019,295 | 5/1991 | Yoshida et al. ......................... 252/518 |
| 5,130,055 | 7/1992 | Yasutomi et al. ....................... 500/102 |
| 5,217,651 | 6/1993 | Nagaoka ................................. 252/518 |
| 5,332,701 | 7/1994 | Bryson et al. ............................ 501/87 |
| 5,447,661 | 9/1995 | Takahashi et al. ...................... 252/511 |
| 5,549,849 | 8/1996 | Namura et al. ......................... 252/503 |
| 5,549,851 | 8/1996 | Fukushima et al. .................... 136/263 |
| 5,565,041 | 10/1996 | Hiraoka et al. ......................... 136/263 |

FOREIGN PATENT DOCUMENTS 0 412 428  2/1991  European Pat. Off. .

Primary Examiner—Mark Kopec
Assistant Examiner—Derrick G. Hamlin
Attorney, Agent, or Firm—Venable; George H. Spencer; Ashley J. Wells

[57] ABSTRACT

A ceramic electric resistor is proposed which can be made by means of ceramizing at least one organo-silicon polymer and at least one filler. The filler comprises at least one high-melting electrically conductive component, with the filler portion amounting to 20 to 50 vol. % relative to the solvent-free polymer-filler mixture. The specific electrical resistance can be set by varying the filler portion. The ceramic electric resistor is particularly suited as heating conductor for pencil-type glow plugs.

9 Claims, 2 Drawing Sheets

CERAMIC ELECTRIC RESISTOR

CROSS-REFERENCE TO RELATED APPLICATIONS

This Application is a continuation-in-part of U.S. application Ser. No. 08/817,596 filed as PCT/DE95/01452 on Oct. 19, 1995, now abandoned and claims the priority benefits of P 44 37 324.4 filed in Germany on Oct. 19, 1994 and 195 38 695.7 filed in Germany on Oct. 18, 1995, the entire specifications of which are incorporated herein by reference.

BACKGROUND OF THE INVENTION

1. Field of the Invention

The invention relates to a ceramic electric resistor which can be made by means of ceramizing at least one organo-silicon polymer and at least one filler, and to its use.

2. Background of the Related Art

From EP-A 0 412 428 A1, ceramics based on organo-silicon polymers having fillers of intermetallic substances, metals and metallic hydrides are known. However, applications in electric circuits in the form of resistors or conductors are not known.

While metallic heating conductors can be used up to 1300° C., the maximum temperature of ceramic heating conductors is approx. 1800° C. Ceramic heating conductors according to the prior art are only available with a very low or a very high specific resistance (e. g., $MoSi_2$ $2\times10^{-2}$ ohm cm; SiC 5 ohm cm). Intermediate values can scarcely be set with conventional ceramic materials. The electrical resistance of a sintered ceramic can be varied only within narrow limits even by mixing ceramic powders having different specific resistances because the sintering capacity is impaired considerably by the addition of foreign substances.

It is an object of the present invention to create ceramic electric resistors or heating conductors for high-temperature applications.

In this context, it is a further object of the present invention to set the specific electrical resistance in a simple and easily reproducible manner.

SUMMARY OF THE INVENTION

These and other objects are accomplished by the present invention which provides a ceramic electric resistor, particularly for use at high temperatures, A ceramic electric resistor, comprising a ceramized mixture comprised of organo-silicon polymer and from 20 to 70 vol. % of filler based on the mixture, which mixture is solvent-free, wherein the organo-silicon polymer is at least one polymer selected from the group consisting of polysilane, polycarbosilane, polysilazane and polysiloxane, wherein the filler comprises (a) at least one electrically conductive constituent which is high-melting and which is selected from the group consisting of $MOSi_2$, $CrSi_2$, SiC, graphite, $Si_3N_4$ and $ZrO_2$, and (b) at least one additional constituent which is one of electrically insulating or semi-conducting; and wherein specific electrical resistance of the ceramic electric ceramic may be adjusted by varying the amount of the filler.

In the ceramic electric resistor according to the invention, different filler powders with different electrical properties can be used. Impairment of the ceramic is excluded to the greatest possible extent because the compaction behavior during pyrolysis is determined decisively by the thermal decomposition of the polymer and not by the sintering properties of the powders that are used.

Tests have shown that if the claimed material composition of the starting material is complied with, the shaping by means of conventional methods of plastics or ceramics processing is ensured, with it being possible to set predetermined specific resistance values after the pyrolysis in the range from $10^{-6}$ to $10^{11}$ ohm cm. It was possible to make particularly time-stable resistors and conductors at pyrolysis temperatures in the range from 1200° to 1500° C. Here, a theoretical density of 70%–98% is accomplished.

Further improvements are achieved by way of the features and measures cited in the dependent claims.

In a first embodiment, the electrically conductive constituent is $MoSi_2$ which is present in an amount ranging from 5 to 50 vol. % relative to the solvent-free mixture, and the at least one additional constituent is Si. The $MoSi_2$ and the Si may be present in a mixing ratio of $MoSi_2$:Si so that the ceramic electric resistor has a linear resistance temperature dependence for a temperature range of from 0 to 900 degree Celsius. Preferably, the filler is present in an amount of 40 vol. % relative to total volume, and the mixing ratio of $MoSi_2$:Si is 1:1.

In a second embodiment, the electrically conductive constituent is $MoSi_2$, which is present in an amount ranging from 5 to 50 vol. % relative to the solvent-free mixture, and the at least one additional constituent is SiC. The $MoSi_2$ and the SiC are advantageously present in a mixing ratio of $MoSi_2$:SiC ranging from 5:15 to 15:25 vol. % relative to total volume.

In a third embodiment, the electrically conductive constituent is $MoSi_2$ which is present in an amount ranging from 5 to 50 vol. % relative to the solvent-free mixture, and the at least one additional constituent comprises from 3 to 18 vol. % of SiC and from 3 to 20 vol. % of $Al_2O_3$ relative to the solvent-free mixture. The $MoSi_2$ is advantageously present in an amount ranging from 5 to 30 vol. % relative to the solvent-free mixture.

The filler may be a powder which is one of a ceramic powder or a metallic powder and which has a grain size ranging from 0.01 to 100 μm.

The ceramic electric resistor according to any of the foregoing embodiments may be use as a heating conductor and such heating conductors may be formed into a pencil-type glow plug.

If the pyrolysis is carried out under inert gas, forming gas or reaction gas, resistors are obtained which show little shrinkage and are dimensionally stable and which are free from cracks and have few pores. Excellently suited as pyrolysis atmosphere are Ar, $NH_3$, $N_2$ and their gas mixtures.

Under inert Ar atmosphere, chemical reactions can only occur between filler and polymer but not with the atmosphere. Employing a reducing $NH_3$ atmosphere results in a reduction of the C portion in the matrix material and thus in an electrical conductivity that is lower than under Ar. During pyrolysis under a reactive $N_2$ atmosphere, filler constituents and/or matrix constituents can react with the pyrolysis gas to form nitrides and can also change the electrical conductivity of the composite body during this process.

For shaping by casting, extrusion, hot press molding and/or injection molding, it turned out to be advantageous to use a polysiloxane which is condensation-crosslinked and solid at room temperature and to make such resistors or conductors.

If the fillers are added in the desired ratio, the electric resistor of the ceramic according to the invention very advantageously shows a positive temperature coefficient if a mixture of molybdenum disilicide and silicon is used. A mixing ratio of $MoSi_2:Si=20:20$ percent by volume relative to the volume of the resistor material is particularly suited for glow elements with heating-up periods of a few seconds for pencil-type glow plugs.

Furthermore, prepyrolyzed and/or cured organo-metallic polymers can be used in addition to electrically conductive non-metals, intermetallic compounds or metals. Therewith, it is possible to exploit the different electrical properties of different matrix materials side by side for a resistor or conductor, thus avoiding the disadvantages of only one matrix material and expanding the fabrication possibilities.

BRIEF DESCRIPTION OF THE DRAWING

In the following, the invention is explained in greater detail by way of the examples and with reference to the attached drawings in which.

DESCRIPTION OF THE PREFERRED EMBODIMENTS

Figure 1:
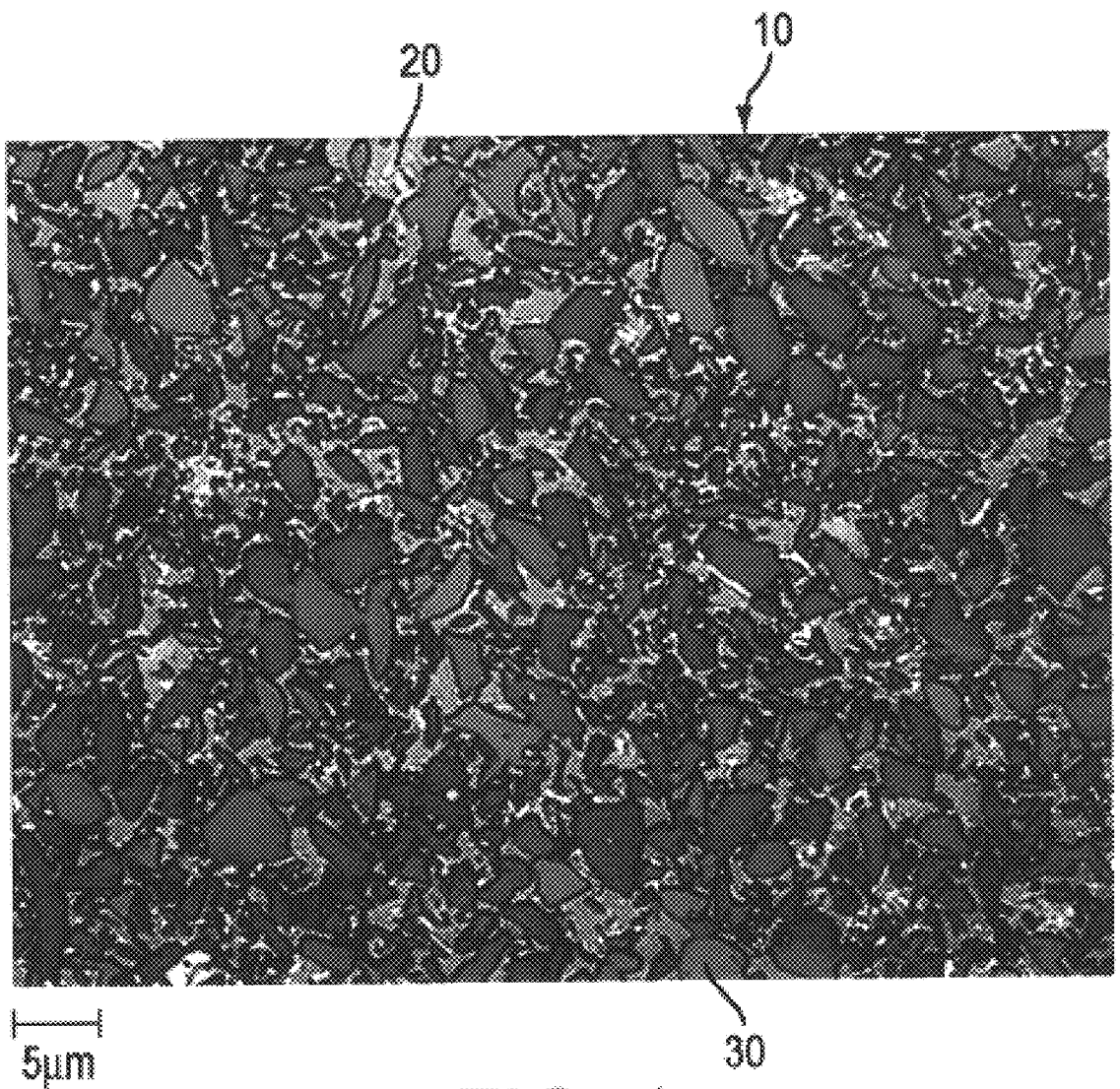
FIG. 1 illustrates the structure of a composite body having 50 vol. % $MoSi_2$ according to Example 1.

FIG. 1 illustrates the structure of a resistor 10 according to the invention made from polysiloxane with 50 vol. % $MoSi_2$ filler, which was pyrolyzed at 1200° C. in an argon stream. Composition and fabrication correspond to Example 1. On average, the grain diameter is below 5 micrometer, as is shown by the scale. The grains 30 are visible in gray and the amorphous matrix phase 20 is light-colored.

Figure 2:
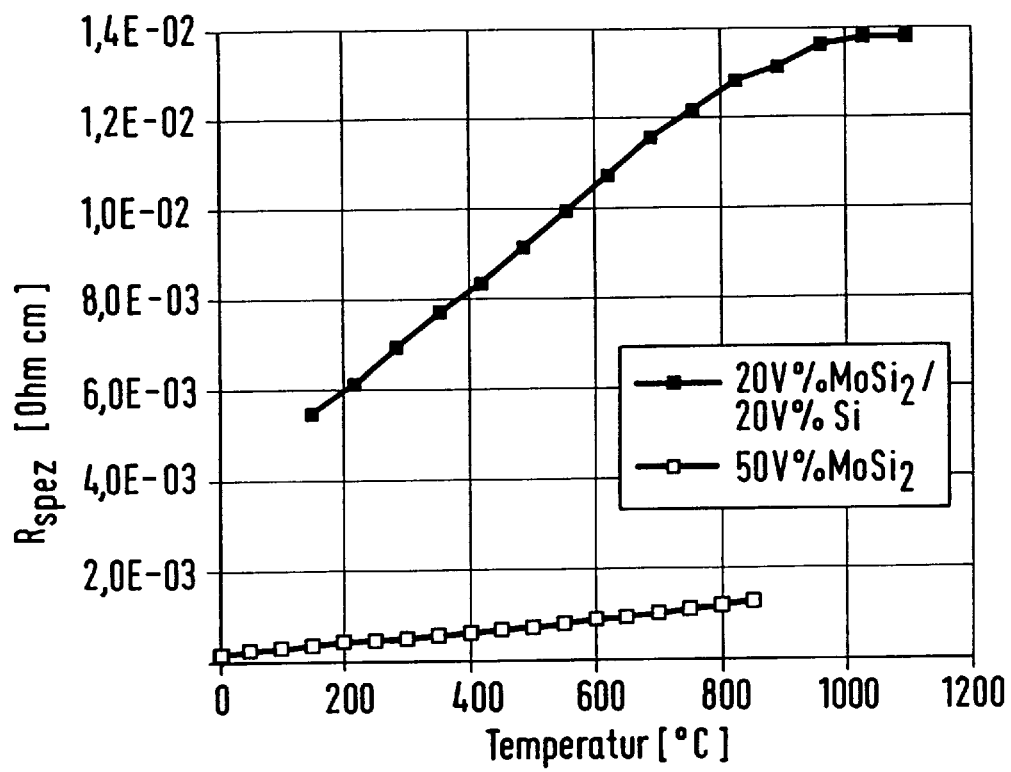
FIG. 2 illustrates the temperature dependence of the specific electrical resistance $R_{spec}$ of two embodiments of resistors according to the invention having positive temperature coefficients.

The diagram in FIG. 2 illustrates the electrical resistance for a temperature range up to 1200° C. The volume portion of the filler mixture $MoSi_2:Si=20:20$ is 40 vol. % relative to the entire volume. The electrical resistance rises approximately linearly up to approx. 800° C. and then flattens. Considerably lower is the specific electrical resistance in a material with 50 vol. % $MoSi_2$ as filler, but which also has a positive temperature coefficient. As a consequence, an increase of the volume portion of the conductive material mixture results in a reduction of the specific electrical resistance, as expected.

Figure 3:
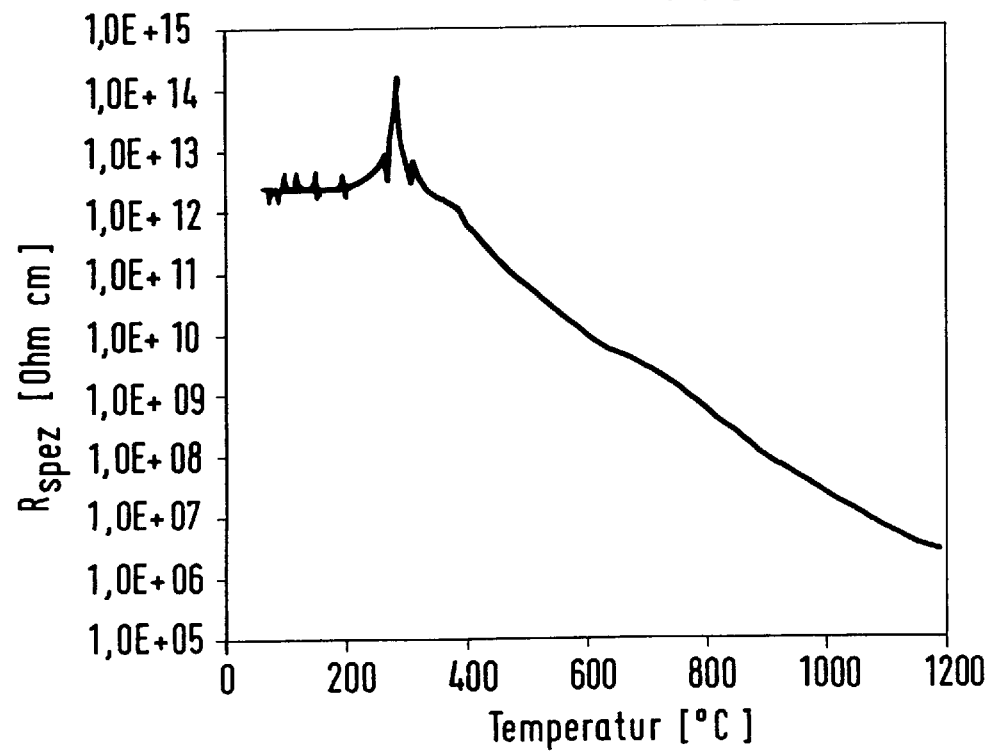
FIG. 3 illustrates the temperature dependence of the specific electrical resistance $R_{spec}$ of an embodiment of a resistor according to the invention having a negative temperature coefficient.

FIG. 3 illustrates a diagram similar to that of FIG. 2 but for a filler volume portion of 50 vol. % $Si_3N_4$ ($\beta$-$Si_3N_4$). The resistor becomes more conductive as the temperature increases, that is, the resistor has a negative temperature coefficient. Filler mixtures were also made from fillers causing a positive and from fillers causing a negative temperature coefficient for resistors so as to set a constant resistance range.

If the following text does not discuss the pyrolysis, it is carried out in the examples with the protective gas argon.

EXAMPLE 1

23.1 g addition-crosslinking methylphenyl vinyl hydrogen polysiloxane (Wacker silicone impregnating resin H62 C) are placed into a beaker and are dissolved in 50 ml acetone. In this solution are dispersed 126.9 g $MoSi_2$ powder (H.C. Starck molybdenum disilicide, grade B, grain size $d_{50}=3.0$ $\mu$m, 98%<10 $\mu$m) by means of a magnetic stirrer. This corresponds to a filler loading of 50 vol. % relative to the solvent-free polymer-filler mixture. The suspension is poured onto a Hostaphan™ film and the acetone is expelled in the circulating air drying cabinet at 50° C. Alternatively, other solvents are also used, such as toluene, hexane, alicyclic or aromatic hydrocarbons. A modeling clay-type substance is obtained which can be portioned by hand. The compound is pressed into a compression mold and cured for 30 minutes at a pressure of 10 MPa and a temperature of 200° C.

The shaped body obtained in this manner is pyrolyzed under flowing argon (5l/h) with the following temperature program of Table 1:

TABLE 1

| Heating up rate/ cooling down rate (° C./min) | Final temperature (° C.) | Holding time (min) |
| --- | --- | --- |
| 5 | 450 | 120 |
| 5 | 1200 | 240 |
| 2.5 | 20 | — |

As illustrated in FIG. 1, the material is largely comprised of $MoSi_2$ embedded in an amorphous Si—$O_x$—$C_y$ matrix. Very small amounts of $MoSi_2$ react with carbon from the polymer to form SiC and $MoC_2$. The body has a density of 4.1 g/cm³ and an open porosity of 14.3%. The specific electrical resistance $R_{spec}$ at room temperature is $2.2 \times 10^{-4}$ ohm cm, measured according to four-point-technique with a Burster Digomat Microohmmeter Type 2302 on rod-shaped samples having a rectangular cross section. The mechanical 4-point flexural strength of the material is approx. 115 MPa.

EXAMPLE 2

The procedure is the same as in Example 1, but $MoSi_2$ powder as filler is replaced by $CrSi_2$ powder (H.C. Starck chromium silicide, <10 micron, grain size $d_{50}=3.7$ $\mu$m) and is added in a volume portion of 40 vol %. After the pyrolysis, the filler embedded in the amorphous matrix is still largely comprised of $CrSi_2$. In addition, CrSi, SiC and $SiO_2$ (cristobalite) are present as crystalline phases. The pyrolyzed material has a density of 3.5 g/cm³ and an open porosity of 3.3%. The specific electrical room temperature resistance is $3.0 \times 10^{-3}$ ohm cm, the flexural strength 120 MPa.

EXAMPLE 3

The procedure of Example 1 is repeated with the difference that, instead of $MoSi_2$ powder, 50 vol. % silicon powder is added (H.C. Starck SiMP, B 10, grain size $d_{50}=4.4$ $\mu$m). The Si filler remains almost unchanged; only very small amounts of SiC are formed. This material has a density of 2.1 g/cm³ at an open porosity of 3.3%. The specific electrical room temperature resistance is $1.0 \times 10^2$ ohm cm, the flexural strength 70 MPa.

EXAMPLE 4

The procedure is the same as in Example 1, but a powder mixture comprised of 19.5 g Si powder and 52.0 g $MoSi_2$ powder is added to 28.5 g siloxane resin. This corresponds to a filler content of 20 vol. % Si (H.C. Starck SiMP, B 10) and 20 vol. % $MoSi_2$ (H.C. Starck molybdenum disilicide, grade B). The pyrolyzed material has a density of 3.2 g/cm³

EXAMPLE 5

The procedure is the same as in Example 1, with 42.2 g siloxane being dissolved in 100 g acetone. 49.8 g SiC (SiC powder F600 gray, Elektrochschmelzwerk Kempten, 90%<22 µm, mean grain size 12 µm) and 57.9 g $MoSi_2$ are dispersed in the solution. This corresponds to a filler portion of 40 vol % relative to the solvent-free polymer-filler mixture, with $MoSi_2$:SiC being used at a ratio of 15:25 vol. %. The specific electrical resistance $R_{spec}$ is 2×10 ohm cm.

EXAMPLE 6

The procedure is the same as in Example 1, with 80.1 g siloxane being dissolved in 150 g acetone. 42.5 g SiC and 27.4 g $MoSi_2$ are dispersed in the solution. This corresponds to a filler portion of 20 vol % relative to the solvent-free polymer-filler mixture with a ratio of $MoSi_2$:SiC=5:15 vol. %. The specific electrical resistance $R_{spez}$ is $3 \times 10^8$ ohm cm.

EXAMPLE 7

A material is produced according to Example 1, with the difference that, instead of $MoSi_2$ powder, 50 vol. % graphite powder (Aldrich 28, 286-3, grain size: 1 to 2 µm) is added. The pyrolyzed body has a density of 1.9 g/cm³ at an open porosity of 8.9%. The specific electrical resistance at room temperature is $1.6 \times 10^{-2}$ ohm cm.

EXAMPLE 8

The procedure is the same as in Example 1, but $Si_3N_4$ powder (H.C. Starck Si3N4, S1, grain size $d_{50}$=0.9 µm) is added as a filler. The filler loading amounts to 50 vol %. A high-ohmic material is produced whose specific room temperature resistance was determined with a teraohmmeter HP 4339A according to two-point technique. It amounts to $3.6 \times 10^{10}$ ohm cm. The density is at 2.1 g/cm³, the open porosity is 27.4%. Example 6 was repeated with AlN and BN.

EXAMPLE 9

A ceramic material is produced according to the procedure described in Example 1, but 30 vol. % $Al_2O_3$ powder (Alcoa XA 1000, grain size $d_{50}$=0.5 µm) is added as a filler. The pyrolyzed ceramic has a specific electrical room temperature resistance of $3.5 \times 10^4$ ohm cm. The density amounts to 2.8 g/cm³ at an open porosity of 2.8%.

EXAMPLE 10

The procedure is the same as in Example 1, but 70 vol. % Fe powder (Höganäs ASC 100, grain size $d_{50}$=60 µm) is added as a filler. The density of the pyrolyzed material is 6.1 g/cm³ at an open porosity of 13.8%. The material has an electrical room temperature resistance of $2.0 \times 10^{-5}$ ohm cm.

EXAMPLE 11

According to Example 8, a shaped body is produced which comprises a mixture of Fe powder and $ZrO_2$ powder instead of pure Fe powder. The filler content amounts to 20 vol. % Fe (Höganäs ASC 100) and 20 vol. % $ZrO_2$ (Magnesium Electron Ltd. zirconium dioxide SC 30 R, grain size $d_{50}$=14.5 µm) relative to 100 vol. % composite body. The specific room temperature resistance of the pyrolyzed material is $2.2 \times 10^{-3}$ ohm cm. Example 9 was carried out repeatedly with $ThO_2$, CeO, $CeO_2$ or a mixture of $ZrO_2$ with $HfO_2$.

EXAMPLE 12

The procedure is the same as in Example 3, but a condensation-crosslinking polysiloxane (Chemiewerk Nünchritz NH 2400) is used as a polymer which is available in solid form at room temperature. Instead of a modeling clay-type compound, a coarse-grained granulate is obtained after the solvent is removed, which granulate is further processed by grinding. Deviating from Example 3, the ground granulate is shaped by injection molding and subsequently pyrolyzed, as described in Example 1.

EXAMPLE 13

A material is produced according to Example 6, but, instead of polysiloxane, a polysilazane (Hoechst VT 50) is used as polymer and filled with 50 vol. % $Si_3N_4$ powder. The addition of acetone is omitted because the polysilazane is already dissolved in THF. The pyrolysis only takes place under flowing nitrogen atmosphere. Deviating from Examples 1 to 12, the amorphous matrix in this case is comprised of $Si_{1.0}N_{1.3}C_{1.6}$. The density of the pyrolyzed material is 1.8 g/cm³ at an open porosity of 24.0%. The grain size of the powders used in Examples 1 to 14 was varied if the variation led to a better adaptation to the intended purpose of the composite body.

EXAMPLE 14

Ceramic Glow Element

A U-shaped body is produced according to one of the procedures described in Examples 1 to 12. The shaping is effected through hot press molding.

The legs are contacted via a soldered connection. The material composition is selected such that, when a voltage to be specified is applied to the contact points, the body glows at the point of its smallest cross section and reaches a temperature which is required for the ignition of a gas or gas mixture.

EXAMPLE 15

High-temperature Resistant Conductor Track

A polymer-filler mixture is made according to the Examples 1 to 12. After the solvent is removed, the compound, which is patterned by means of doctor blades or screen printing, is applied to a not yet pyrolyzed, filled organo-silicon substrate. The filled polymer layer is cured in the drying cabinet at 200° C. Subsequently, layer and substrate are jointly pyrolyzed at temperatures between 800 and 1400° C. A high-temperature resistant conductor track is obtained on the substrate, with it being possible to set the resistance of the conductor track via the filler composition.

EXAMPLE 16

High-temperature Resistant Electrical Circuit

The procedure is the same as in Example 13, but patterns are applied which consist of polymer-filler mixtures with locally different composition resulting in different electrical resistances. A high-temperature resistant electric circuit is obtained. The composition of the polymer-filler mixture can be varied in the plane of the substrate as well as perpendicularly to the plane. In the second case, the electric circuit is designed in multilayer technique.

EXAMPLE 17

A High Electrical Conductivity Resistor for an Electrically Conductive Component Includes

|  | $MoSi_2$ | SiC | $Al_2O_3$ |
|---|---|---|---|
| Proportions: | 15–50 vol. % | 5–18 vol. % | 3–10 vol. %. |

EXAMPLE 18
A Resistor that is Electrically Nearly Insulating for an Electrically Inverting Component Includes

|  | $MoSi_2$ | SiC | $Al_2O_3$ |
|---|---|---|---|
| Proportions: | 5–18 vol. % | 3–13 vol. % | 9–20 vol. %. |

It is understood that various other modifications will be apparent to and can be readily made by those skilled in the art without departing from the scope and spirit of the present invention. Accordingly, it is not intended that the scope of the claims appended hereto be limited to the description set forth above but rather that the claims be construed as encompassing all of the features of patentable novelty which reside in the present invention, including all features which would be treated as equivalents thereof by those skilled in the art to which the invention pertains.

What is claimed is:

1. A ceramic electric resistor, comprising:
    a ceramized mixture comprised of organo-silicon polymer and from 20 to 70 vol. % of filler based on the mixture, which mixture is solvent-free,
    wherein the organo-silicon polymer is at least one polymer selected from the group consisting of polysilane, polycarbosilane, polysilazane and polysiloxane,
    wherein the filler comprises (a) at least one electrically conductive constituent which is high-melting and which is selected from the group consisting of $MoSi_2$, $CrSi_2$, SiC, graphite, $Si_3N_4$ and $ZrO_2$, and (b) at least one additional constituent which is one of electrically insulating or semi-conducting; and
    wherein specific electrical resistance of the ceramic electric ceramic may be adjusted by varying the amount of the filler.

2. The ceramic electric resistor according to claim 1, wherein the electrically conductive constituent is $MoSi_2$ which is present in an amount ranging from 5 to 50 vol. % relative to the solvent-free mixture, and wherein the at least one additional constituent is Si.

3. The ceramic electric resistor according to claim 2, wherein the $MoSi_2$ and the Si are present in a mixing ratio of $MoSi_2$:Si so that the ceramic electric resistor has a linear resistance temperature dependence for a temperature range of from 0 to 900 degree Celsius.

4. The ceramic electric resistor according to claim 3, wherein the filler is present in an amount of 40 vol. % relative to total volume, and wherein the mixing ratio of $MoSi_2$:Si is 1:1.

5. The ceramic electric resistor according to claim 1, wherein the electrically conductive constituent is $MoSi_2$, which is present in an amount ranging from 5 to 50 vol. % relative to the solvent-free mixture, and wherein the at least one additional constituent is SiC.

6. The ceramic electric resistor according to claim 5, wherein the $MoSi_2$ and the SiC are present in a mixing ratio of $MoSi_2$:SiC ranging from 5:15 to 15:25 vol. % relative to total volume.

7. The ceramic electric resistor according to claim 1, wherein the electrically conductive constituent is $MoSi_2$ which is present in an amount ranging from 5 to 50 vol. % relative to the solvent-free mixture, and wherein the at least one additional constituent comprises from 3 to 18 vol. % of SiC and from 3 to 20 vol. % of $Al_2O_3$ relative to the solvent-free mixture.

8. The ceramic electric resistor according to claim 7, wherein the is $MoSi_2$ is present in an amount ranging from 5 to 30 vol. % relative to the solvent-free mixture.

9. The ceramic electric resistor according to claim 1, wherein the filler is a powder which is one of a ceramic powder or a metallic powder and which has a grain size ranging from 0.01 to 100 $\mu$m.

* * * * *